United States Patent
Henning

[11] 3,843,217
[45] Oct. 22, 1974

[54] ANTIFRICTION BEARING

[76] Inventor: Albert Henning, Attenberg-Schildchen 14, 5202 Hennef/Sieg, Germany

[22] Filed: Aug. 2, 1973

[21] Appl. No.: 384,928

[30] Foreign Application Priority Data
Aug. 7, 1972    Germany........................... 2238820

[52] U.S. Cl. .............................................. 308/187
[51] Int. Cl. ............................................ F16c 33/66
[58] Field of Search ..................................... 308/187

[56] References Cited
UNITED STATES PATENTS
3,528,711    9/1970    Atkinson............................ 308/187

*Primary Examiner*—Charles J. Myhre
*Assistant Examiner*—Frank Susko
*Attorney, Agent, or Firm*—Walter Becker

[57] ABSTRACT

An antifriction bearing, especially a roller bearing with inner and outer races and rollers therebetween and spacer elements disposed between the rollers. End rings close the gaps between the races at the ends and are connected with the spacer elements. The end rings are caused to rotate about an axis eccentric to the axis of the bearing and thereby cause the spacer elements to move in an eccentric path. The spacer elements in moving radially between the rollers are accompanied by movement of the rollers away from each other and toward each other. Fluid connections extending into the space between the races communicate with the chamber established between adjacent rollers and the end rings and the bearing is thus adapted to operate as a lubricant pump as the races rotate relatively.

14 Claims, 4 Drawing Figures

ANTIFRICTION BEARING

The present invention concerns an antifriction bearing in which circular cylindrical roller bodies together with spacer means are arranged between an inner face ring and an outer race ring while the circular openings between the inner race ring and the outer race ring are at the sides of the antifriction bearing covered up by annular elements.

It is an object of the present invention to provide an antifriction bearing of the above referred to type which when built into a machine system at an appropriate place will act as bearing as well as pump, preferably for delivering lubricating oil, so that a lubricating pump for the machine system will not be needed.

This object and other objects and advantages of the invention will appear more clearly from the following specification in connection with the accompanying drawings, in which.

Figure 1:
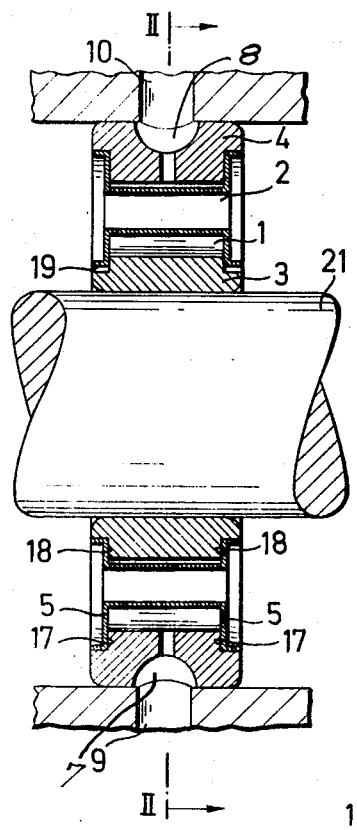
FIG. 1 illustrates a vertical longitudinal section of an antifriction bearing according to the invention, said section being taken along the line I — I of FIG. 2.

The antifriction bearing according to the present invention is characterized in that for obtaining a pumping effect, preferably for pumping lubricating oil, grooves are provided in the outer surface of the outer race ring which grooves are partially located opposite to each other while one of the grooves is connected to a suction line whereas the other groove is connected to a pressure line, and while openings lead from these grooves into the space between the outer race ring and the inner race ring, and furthermore characterized in that the spacer means are independently of the roller bodies guided by annular elements on an annular path which is eccentric to the annular path on which the roller bodies are guided, and furthermore characterized in that the eccentricity of the annular path for the spacer means is directed toward the openings in the outer race ring which openings lead to the pressure line.

For one direction of rotation of the antifriction bearing it has proved advantageous when the grooves provided in the outer surface of the outer race ring and extending in the circumferential direction of the outer race ring extend from the dead center positions of the eccentricity of the spacer means in a direction counter to the direction of rotation of the cylindrical roller bodies or spacer means.

With respect to the installation and the operation of the antifriction bearing according to the invention it is advantageous when the annular elements are eccentrically mounted on the stationary outer race ring. This mounting is, according to the present invention, realized by embedding the annular elements in annular recesses of the outer race ring and the inner race ring while the annular recesses of the inner race ring surround with play the annular elements in radial direction.

A particularly advantageous design for the antifriction bearing according to the invention is obtained when the spacer means have the same length as the roller bodies and are firmly connected to the two annular elements. Inasmuch as the annular elements slidingly engage the bearing rings, the annular elements are at those sides which face toward the bearing rings covered by a good conductive elastic sealing material.

As far as the spacer means are concerned, various shapes are possible therefor. Thus, the spacer means according to the invention may have a prism-shaped cross section which is either triangular or trapezoidal while the base surfaces of the prism, when viewed in radial direction, face toward the outer race ring. In order to exclude any possible friction of the cylindrical roller bodies on the spacer means, it may be advantageous to have the spacer means designed as roller needles which are held in cage portions firmly connected to the annular elements and, when the roller needles are guided on an eccentric circular path, the diameter of which equals or is greater than the diameter of the circular path on which the antifriction bodies move.

Referring now to the drawings in detail, similar parts in the various figures which are of the same design have been designated with the same reference numerals. Referring more specifically to the antifriction bearing of FIGS. 1 and 2, this bearing has cylindrical roller bodies 1 together with spacer means 2 arranged between an inner race ring 3 and an outer race ring 4. The annular openings provided between the inner race ring 3 and the outer race ring 4 are at the sides of the antifriction bearing covered by annular elements 5. The outer surface 6 of the outer race ring 4 is provided with grooves 7 and 8 which extend in circumferential direction of the bearing and which partially are located opposite to each other. Groove 7 is connected to a suction conduit 9 whereas groove 8 is accordingly connected to a pressure conduit 10. From the grooves 7 and 8 respectively pass openings 11 and 12 into the space between the outer race ring 4 and the inner race ring 3. The spacer means 2 are independently of the roller bodies 1 by circular elements guided on a circular path 14. This path 14 extends eccentrically with regard to the circular path 15 on which the roller bodies 1 are guided. The eccentricity in FIG. 2 is designated with the reference numeral 16.

Figure 2:
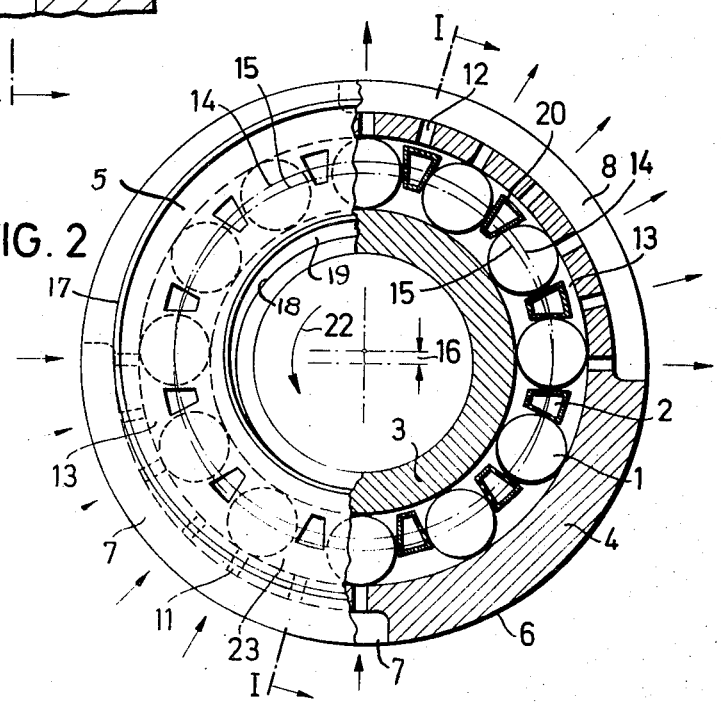
FIG. 2 illustrates the antifriction bearing of FIG. 1 partly in view and partly in section along the line II — II of FIG. 1.

As will be seen in particular from FIG. 2, the eccentricity 16 of the circular path 14 of the spacer means 2 is directed toward the openings 12 in the outer race ring 4, the openings leading to the pressure line 10. The grooves 7 and 8 which are provided in the outer surface 6 of the outer race ring 4 in the circumferential direction of the outer race ring 4 extend from the dead center positions of the eccentricity in a direction counter to the direction of rotation of the cylindrical roller bodies 1 and spacer means 2.

The annular elements 5 are eccentrically mounted on the stationary outer race ring 4. To this end, the outer race ring 4 is at both sides provided with eccentric recesses 17. Accordingly, also on both sides of the inner race ring 3 there are provided recesses 18 which surround with play the annular elements 5 in radial direction. The play has been indicated in FIG. 1 with the reference numeral 19.

The spacer means 2 have the same length as the roller bodies 1. The spacer means are firmly connected to the two annular elements 5. Inasmuch as the elements 5 slide by the inner race ring 3 and the outer race ring 4, they have those sides thereof which face toward the bearing rings 3 and 4 covered with an elastic sealing material. The spacer means 2 have a trapezoidal cross section while the base surfaces 20 of the trapezoidal cross section when viewed in radial direction are directed toward the outer race ring 4. Instead of the trapezoidal cross section, the spacer means 2 may also have a triangular cross section.

Operation of the bearing according to FIGS. 1 and 2:

It may be assumed that shaft 21 rotates in the direction of the arrow 22 of FIG. 2 in which instance, due to the eccentric movement of the spacer means 2, the distance between the cylindrical roller bodies 1 varies. The distance between two adjacent roller bodies is greatest within the region of the openings 11 and is smallest within the region of the openings 12. Accordingly, also the spaces or chambers 13 between the circular cylindrical roller bodies varies. These spaces or chambers are greatest within the region of the openings 11 and are smallest within the region of the openings 12. As a result thereof, the cylindrical roller bodies 1 will within the region of the openings 11 exert a suction effect upon the openings 11 so that oil will pass through the suction conduit 9 into the groove 7 and from here through openings 11 into the spaces 23 between the cylindrical roller bodies 1. The oil is by the cylindrical roller bodies 1 taken along in the direction of the arrow 22 and within the region of the openings 12 is discharged from the spaces 23 inasmuch as the size of these spaces 23 here decreases. Therefore the oil will flow out of the spaces or chambers 23 through the openings 12 into the groove 8 and from there into the pressure conduit 10 which leads to the lubricating areas of the machine system.

Figure 3:
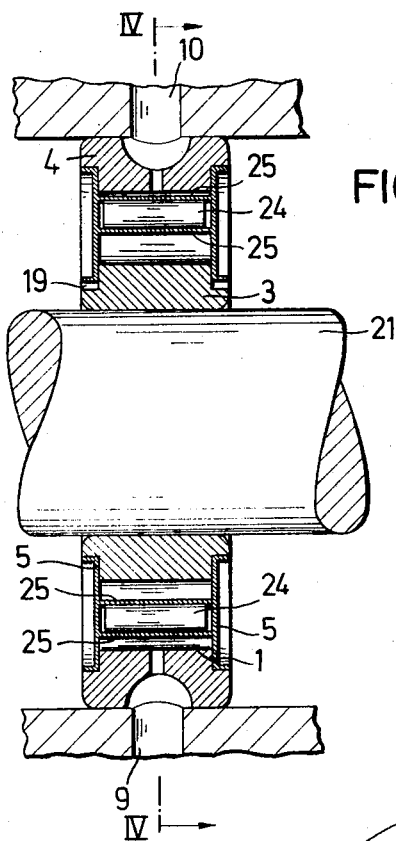
FIG. 3 illustrates a vertical section through an antifriction bearing according to the invention, said section being taken along the line III — III of FIG. 4 and showing an antifriction bearing similar to that of FIGS. 1 and 2 but with different spacer means.
Figure 4:
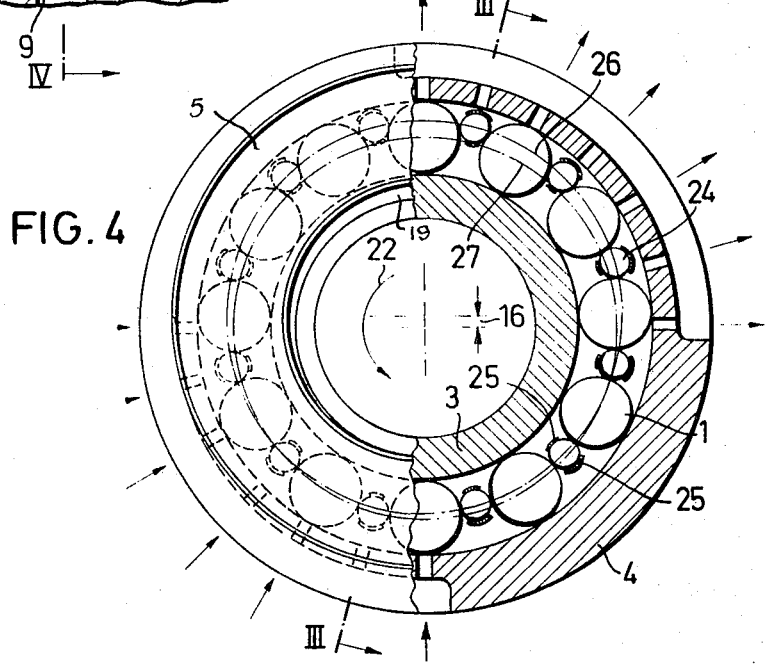
FIG. 4 is a section taken along the line IV — IV of FIG. 3.

The operation of the antifriction bearing according to FIGS. 3 and 4 is the same as that of FIGS. 1 and 2. However, with the antifriction bearing according to FIGS. 3 and 4 different spacer means are employed. In this instance the spacer means are formed by antifriction needles 24 which are held in cage portions 25 which are firmly connected to the circular elements 5. The needles 24 are guided on an eccentric annular path 26 the diameter of which equals or is greater than the diameter of the annular path 27 on which the circular cylindrical roller bodies 1 move.

In the specific embodiment illustrated in the drawing, the outer race ring 4 is stationary, whereas the inner race ring 3 rotates. This is, however, not necessary within the framework of the present invention. Accordingly, a reversal is also possible according to which the inner race ring 3 is stationary and the outer race ring 4 rotates. The feeding and withdrawing of the lubricating oil may be effected within the shaft on which the inner race ring 3 is firmly mounted.

It is, of course, to be understood that the present invention is, by no means, limited to the specific showing in the drawings but also comprises any modifications within the scope of the appended claims.

What is claimed is:

1. An antifriction bearing in which rollers are disposed between inner and outer races and roll therebetween as the races rotate relatively; spacer means arranged in a circular path and extending axially between said rollers, end rings connected to said spacer means and closing the annular gaps between said races at the ends thereof, each of said spacer means having circumferential surfaces engaging the adjacent rollers and converging in the radially inward direction so that radial inward movement of a said spacer means will be accompanied by movement of the adjacent rollers away from each other while radial outward movement of a said spacer means will be accompanied by movement of the adjacent rollers toward each other, guide means on one of said races engaging said end rings and causing eccentric movement of said end rings relative to said races as said rollers roll between said races and carry said spacer means and end rings therewith, and fluid connections extending into the space between said races in the circumferential regions thereof where said rollers are moving away from each other and toward each other respectively.

2. An antifriction bearing according to claim 1 in which said end rings are substantially in engagement with the axial ends of said rollers thereby to form pumping chambers between adjacent rollers.

3. An antifriction bearing according to claim 1 in which said fluid connections are formed in the outer race.

4. An antifriction bearing according to claim 1 in which said guide means is on said outer race.

5. An antifriction bearing according to claim 1 in which each race has an annular recess formed on each end and opening toward the other race, said end rings seating in said recesses, the recesses in the outer race being eccentric relative to the axis of rotation of the bearing and engaging said end rings on the radially outer sides thereby forming said guide means, the recesses in the inner race having radial clearance from the radially inner sides of said end rings.

6. An antifriction bearing according to claim 1 in which the spacer means and rollers are of substantially the same axial length and the spacer means are rigid with said end rings.

7. An antifriction bearing according to claim 1 in which at least the axially inner sides of said end rings have a coating of low friction elastic material thereon.

8. An antifriction bearing according to claim 1 in which each said spacer means has substantially planar surfaces on the opposite sides engaging the rollers adjacent thereto, said surfaces converging toward the center of said bearings.

9. An antifriction bearing according to claim 1 in which each said spacer means is in the form of a needle roller and cage means carried by said end rings and rotatably supporting said needle rollers.

10. An antifriction bearing according to claim 9 in which the circular path of said needle roller is at least as large in diameter as the circular path of the bearing roller.

11. An antifriction bearing according to claim 9 in which the circular path of said needle roller is larger in diameter than the circular path of the bearing roller, said paths being substantially tangent to one another at one circumferential point.

12. An antifriction bearing according to claim 1 in which said guide means is on said outer race and said fluid connections comprise arcuate recesses in the radially outer side of the outer race and at least one radial bore leading from each arcuate recesses through the outer race.

13. An antifriction bearing according to claim 12 in which each annular recess extends from a dead center position of eccentricity of the said spacer means in a direction opposite to the direction of rotation of the spacer means.

14. An antifriction bearing according to claim 12 which includes a plurality of circumferentially spaced radial bores leading from each recess through said outer race.

* * * * *